Figure 5:
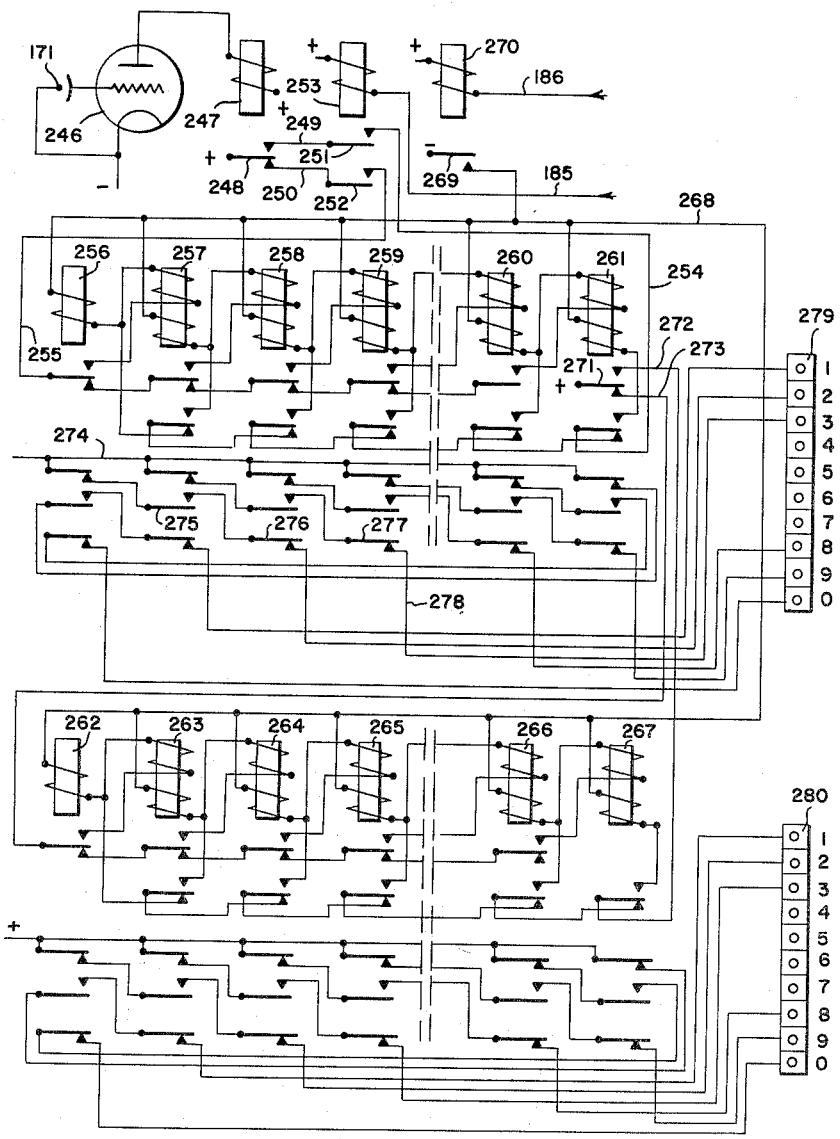

March 16, 1965      N. T. KARLÉN      3,173,503
ARRANGEMENT FOR WEIGHING OSCILLATORY LOAD
Filed Aug. 15, 1960      3 Sheets-Sheet 1
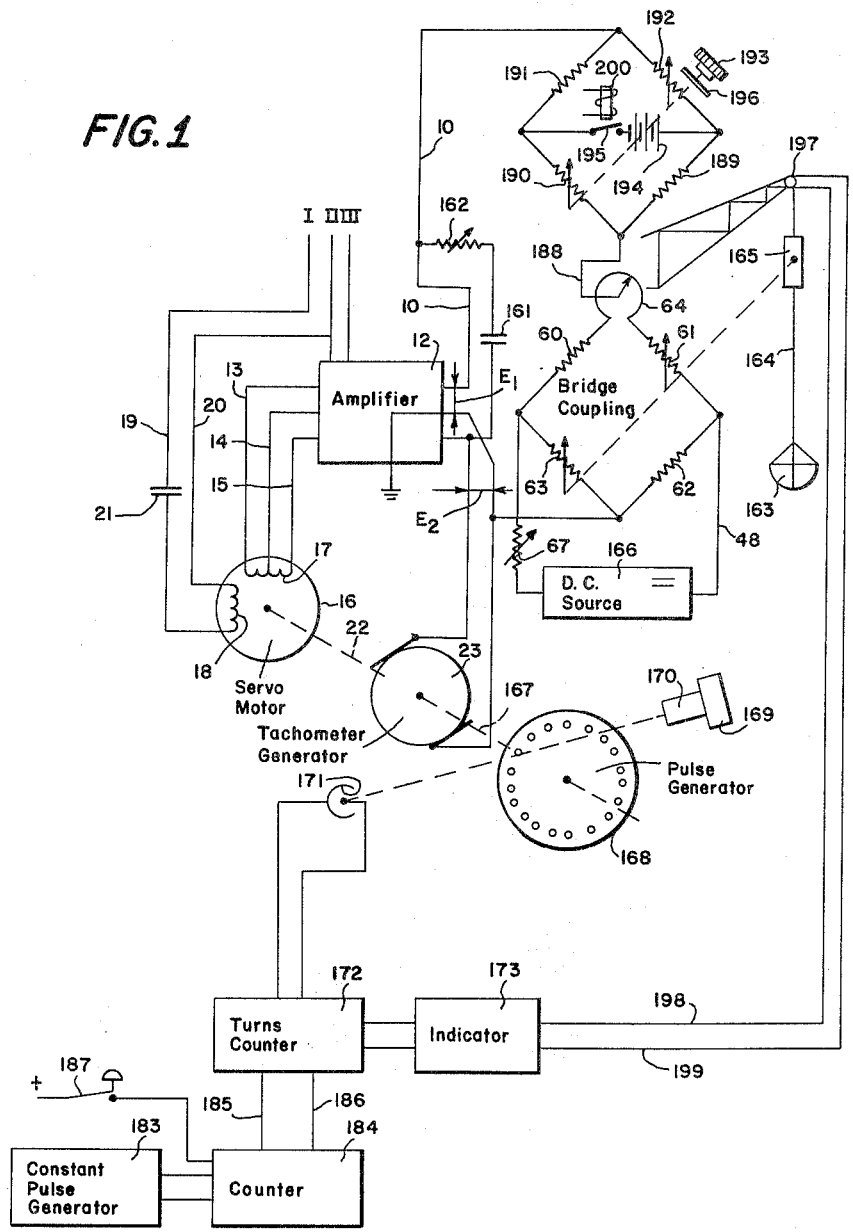
INVENTOR
NIAL TORBJORN KARLEN
BY Larson and Taylor
ATTORNEYS

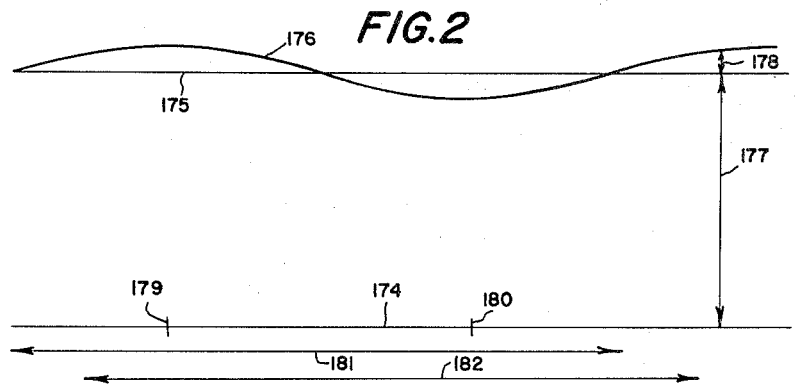
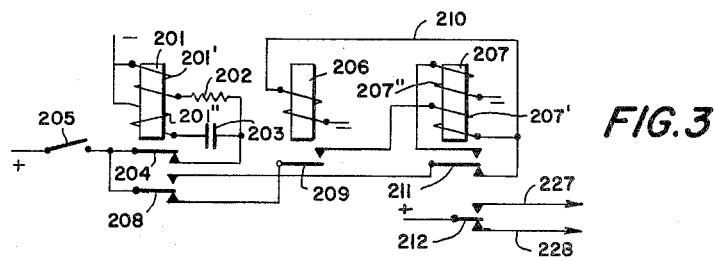
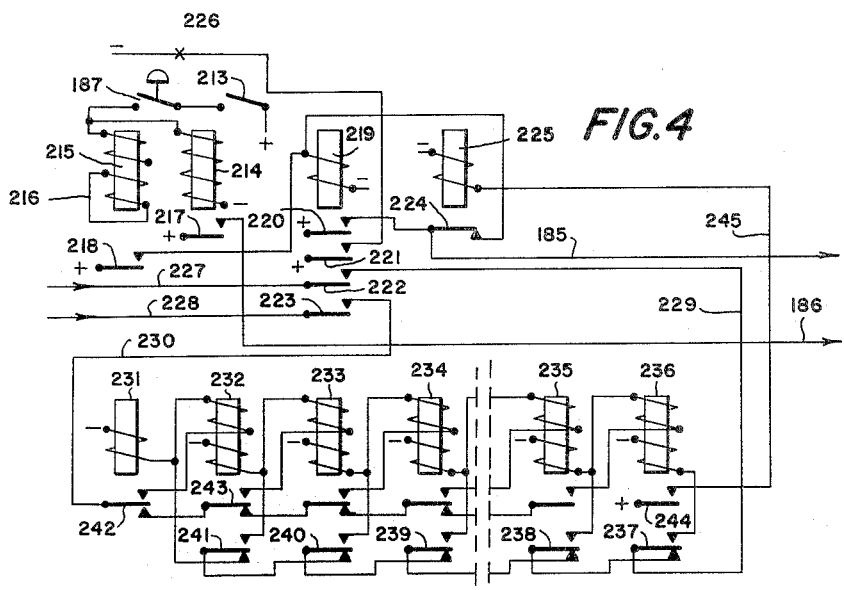

United States Patent Office 3,173,503
Patented Mar. 16, 1965

3,173,503
ARRANGEMENT FOR WEIGHING
OSCILLATORY LOAD
Nial Torbjörn Karlén, Angermannagatan 170,
Vällingby, Sweden
Filed Aug. 15, 1960, Ser. No. 49,784
Claims priority, application Sweden, Apr. 14, 1960,
3,770/60
13 Claims. (Cl. 177—18)

This invention relates to arrangements for weighing an oscillatory load. Such loads are encountered in attempting to weigh material or goods during movement by some form of transportation means. A device to weigh such loads is not only convenient but desirable in such instances as in determining the weight of goods carried in a moving string of cars or else in determining the weight of material carried by a scoop of a crane. Obviously, one would weigh both the goods and the goods-carrying means and then subtract the weight of the carrying means in order to determine the weight of the goods alone.

In all such kinds of weighing devices, one has hitherto had to choose between stopping the transportation until the goods are at complete rest, before the weighing could take place, or one had to satisfy oneself with a very imperfect statement of weight, disturbed by oscillatory movements, which the transportation means used to describe, when it is moving, and which are only slowly declining, when the transportation has been stopped. Neither of these choices is satisfactory. It is true, that one wants to obtain accuracy in the weighing operation, but one does not want that this accuracy should be gained at the expense of an essential delay of time, which is usually necessary for the abovementioned reasons.

The present invention refers to an arrangement for weighing oscillatory load.

One form of execution of the invention is based upon the idea that the weighing should take place in a greater number of short, rapidly following intervals, summarizing or adding the result obtained at each such interval. One can assume, with satisfactory probability, that the different measuring operations will not be synchronous with the oscillation and thereby repeat themselves in the same place of the procedure of oscillation and, as a consequence thereof, throughout have the same error. However, an equalization will be created, if the number of weighing operations rapidly following each other is made sufficiently large.

According to this continuous form of execution of the invention, a servo-motor is provided to drive a pulse generator for creating pulses with a momentary pulse frequency, which is proportional to the momentary number of rotations per unit of time of the servo-motor, and the number of pulses is fed to a counter, which is arranged to be active during an accurately precise predetermined time.

According to a specifically advantageous form of execution of this invention, the counter is combined with a second counter for determining the period of function, and this second counter is fed with pulses from a constant pulse generator for interrupting the operation of the first mentioned counter when the last mentioned counter has counted a predetermined number of pulses from the constant pulse generator.

Further details of the invention will be evident from the following specification of one form of execution of the invention in connection to the attached drawing, in which FIG. 1 shows a general wiring diagram for a weigher device according to the invention, partly in block diagram, whereas FIG. 2 shows a diagram for explaining the function of the invention, and FIGS. 3, 4 and 5 show electrical wiring diagrams over a constant pulse generator, as well as the relay counters and also the time measurer belonging thereto, which can be used in connection with the arrangement according to FIG. 1.

In FIG. 2, in strongly schematical way the weigher device according to the invention is shown, which is intended to be connected to a lifting crane, but this is nevertheless only to be regarded as a chosen form of execution of the use of the invention, and it is obvious that it may utterly easily be modified for all different kinds of applications. The lift derrick is assumed to be provided with a grip scoop 163 which hangs down from a chain, a wire or the like, 164, an arrangement for receiving the weight of the grip scoop as well as the load existing therein and for transferring the statement thereof to the remaining weigher device being interconnected in said hinging arrangement. In the shown form of execution this device 165 contains a deformable part, which during its deformation influences one or more tension variable resistors, that means resistors of the specific kind, the resistance value of which is changing dependent upon the mechanical change of form, to which they are subjected. For simplification of the description the tension variable resistors in the device 165 have been shown separately as the two tension variable resistors 61 and 63 in a bridge.

It should be observed that in this case a stationary weight, which may be subject to oscillations, is measured, but, of course, there is nothing to prevent the same arrangement as described in FIGS. 1–5 also to be used in connection with a movable weight.

In FIG. 1 the voltage of this bridge is fed by means of the conductors 10 and 11 to an amplifier 12, which should preferably but not necessarily be rather close to linear in its characteristics. The amplifier which is suitably of transistor type, is combined with two of the phase conductors II and III of mains network I–II–II of three phase type and functions in such a way that the voltage between the conductors 10 and 11, which was initially a direct voltage, is converted to an alternating voltage of at least approximately proportional magnitude. This voltage is fed to a servo-motor 16, more closely to its one winding system 17, by means of the three output conductors 13, 14, and 15, to which the amplifier is connected in push-pull-coupling, said winding system 17 also being connected in push-pull. The servo-motor 16 is a two-phase alternating current motor and its second winding system 18 is fed with current from the phases I and II by means of conductors 19 and 20 in series with the phase correction condenser 21. The servo-motor is shaped in such a way that its number of rotations per second will rise with an increasing voltage from conductors 13, 14 and 15.

The servo-motor 16, by means of a shaft 22, drives a tachometer generator 23, one of its terminals being connected to the already above mentioned conductor 11 and the other one being connected to a third input conductor 24 to the amplifier 12. The amplifier 12 is connected in a way which forms no part of the present invention, so that it will, controlled by the voltage difference between the representation voltage between the conductors 10 and 11, on the one side, and the tachometer generator voltage between the conductors 11 and 24, on the other side, or in other words, the voltage difference between the conductors 10 and 24, create an alternating current of voltage closely proportional to said voltage difference, but having a frequency equal to the frequency of the network I–II–III. The voltage between the conductors 10 and 11 as well as the voltage between the conductors 11 and 24 therefore are preferably direct voltages even if they may fluctuate during their function on operation.

The arrangement has for its purpose to provide a number of rotations of the shaft 22 of the servo-motor, which is with exceedingly high obeyance or response and accuracy proportional to the voltage between the conductors 10 and 11. The arrangements provided for this purpose contain three main parts, connected into a closed impulse transporting circuit, a so-called servo-circuit. The energy is fed in a non-controlled form to the amplifier 12, from which it is given off to the servo-motor 16. Over the shaft 22 this servo-motor drives the tachometer generator 23, which will again feed its voltage into the amplifier. The control impulse emanates from the conductors 10 and 11. By a method, which is to be regarded as a pure zero control method, disregarding an exceedingly small unessential voltage difference, the servo-circuit functions in the last mentioned respect in such a way that the adjustment or control voltage is amplified by the amplifier 12, and that it will drive the motor 16 in its amplified state which will, in its turn, drive the tachometer generator 23, and this, in its turn creates a voltage for compensation of the control voltage over the conductors 10 and 11.

In an apparatus of the kind described here, certain complications will occur, which act in such a direction, that the weight, indicated by the voltage over the tachometer generator 23 or the total weight, indicated by the number of rotations of the shaft 22, will be rather erroneous, provided that the load is making an oscillatory movement.

The most serious complication is created by the scoop making an oscillating movement in the wire 164 during the movement of the crane and this oscillating movement will in its turn cause a load created by the oscillation to be superimposed on the load on the apparatus 165, really created by the weight of the scoop and its load. The weight is constant, but the load, created by an oscillatory movement will vary, in the simplest case according to a sine wave shape oscillation, in time with the pendulum oscillation of the scoop. An arrangement, containing the servo-motor apparatus according to the present invention, however, will have such an exceedingly high obeyance, which is many times higher than the one required to register even the smallest variations in apparent load, caused by the pendulum movements of the load, in the form of a change of the number of turns of the servo-motor 16. This will therefore move with a number of turns, which practically exactly follows the apparent variations in load in the crane wire due to pendulum movements of the scoop together with the load, contained therein. Any arrangement for directly reading the number of turns of the servo-motor and the weight of the scoop with its load derived therefrom, therefore must give a very unsatisfactory value.

On an extension 167 of the shaft 22 of the servo-motor 16 a pulse generator is applied, so that it will give off one or more distinct pulses for each turn of the shaft of the servo-motor. As a form of execution of such a pulse generator there has been shown in the drawing an arrangement with a lock disc 168, a lamp 169 with an optical system optics 170 and a photo transistor 171. The pulses are fed to a counter 172 connected to an indicator 173. The counting of these pulses shall take place, only upon receiving a signal and the counting is terminated by a second signal.

FIG. 2 shows in diagrammatic form how this arrangement functions. It is assumed that the scoop together with its load is lifted up into a position as shown in FIG. 1 and that the lifting work thereafter is stopped. Now, one knows by experience that it is impossible to lift a load of this kind in such a way that it is in rest when the lifting movement of the wire 164 is stopped. Firstly, it occurs that the lifting movement has been a little inclined, when as the scoop has not been placed exactly below the end of the crane arm at the beginning of the lifting. Secondly, it may occur, that the crane arm was not completely still during the lifting movement. Thirdly, it is further as a rule so, that the scoop is moving to and fro in an inclined position under the proper loading of same, which is corrected by the gravity force as soon as the scoop loses its contact with its support. All of these circumstances cause an oscillation movement to occur, which may assume a very complicated nature, but which will here in order of simplification of the explanation be assumed to have the pure sine-wave form as indicated in FIG. 2, which means in other words, that the scoop 163 will describe a pure pendulum movement of small amplitude.

In FIG. 2 the line 174 indicates the zero value of the weight, as it is marked correctly or incorrectly by the device 165, and the line 175 indicates the real weight. The curve 176, however, represents the weight, which is actually indicated by the device 165, as far as this statement of weight is composed by the real weight 177 and by a force 178 caused by the pendulum movement.

The servo-motor 16 moves with a speed which is practically at any instant directly proportional to the value of the curve 176. At the time 179, therefore, the servo-motor 16 moves with a somewhat too high speed, and at the time 180 it moves with a somewhat too low speed. Any arrangement for instantaneously measuring the speed of the servo-motor and deriving therefrom information about the weight will be misleading within a margin determined by plus or minus the value 178.

For further explanation of the action of the arrangement now described, reference may first be made to the assumption usually not satisfied, that one knows the periodicity of the oscillation, which causes the varying statement of weight according to the curve 176, and that one therefore also knows, that this oscillation comprises exactly the period of time 181. If one would therefore connect a timer, which causes the number of pulses from the pulse generator driven by the servo-motor to be counted during exactly an interval of time of this length, then one would obtain an exact statement about the weight, in which the errors caused by the oscillations have been eliminated. It is true, that the pulses may follow closer after each other at the time 179 than at the time 180, but the total number of pulses during the interval of time 181 will nevertheless be the correct one.

It is of no importance to the accuracy if the time interval 181 should have been displaced, so that it does not start when the curve goes through the zero position and does not end exactly one period later on, but it may start anywhere, and, for instance, be positioned with the same accuracy, as indicated by the line 182 in FIG. 2.

Now, as a rule, one does not know the exact length of one oscillation period, and especially this applies when the oscillation is composed of a plurality of oscillations interposed on each other, which may perhaps be in relations of frequency and which cannot be expressed by full and equal figures. This matter of fact, is however eliminated by the measuring period being extended over such a long time, that a plurality of periods will be included. The accuracy, of course, due to the natural equalization will be increased as the number of periods comprised by the measurement is increased.

The time measuring device in the arrangement according to FIG. 1 consists in a so called constant pulse generator 183, which feeds its pulses to a counter 184. The counter 184 has for its purpose to mark for time measuring purposes, when the pulse counting starts and when a number of pulses have been counted as determined by the measured time interval. At the beginning of the pulse counting, the counter 184 marks over a conductor 185 that the counter 172 shall also start its pulse counting. When the counter 184 has counted in the number of pulses from the constant pulse generator 183, corresponding to the intended measuring time, a renewed marking takes place over the conductor 185, that the counting of pulses from the photo transistor 171 shall cease in the counter 172. Thereby an automatic indication of the number of pulses counted in the counter 172 takes place, which will automatically also indicate the weight of the scoop inclusive of its load. This indication can, for instance, take place in a lamp indicator. A zero-setting pulse to this lamp indicator 173 is further transmitted at some suitable occurrence from the counter 184 over a conductor 186, for instance, immediately before the next following weighing operation shall take place.

For starting the weighing operation, a switch, for instance, a usual push-button 187 is provided. This push-button should be combined with the counter 184 over a conductor, which is so responsive to the machine equipment for the lift crane, that the pulse counter 184 cannot start the weighing operation until the lifting movement of the crane has stopped. Otherwise, acceleration or retardation forces would introduce errors into the measuring result. If the servo-motor 16, the shaft 22, the tachometer generator 23, the shaft extension 167 and the lock disk 168 would be fully free of mass, then this arrangement would function with a complete obeyance. Now, however, it is impossible as a rule to avoid, that the said parts have a given mass, which has to be accelerated or retarded, respectively. The acceleration and retardation will usually be rather small with respect to the oscillation movement along the curve 176, FIG. 2 and, further, the acceleration and retardation occurrence will only mean that the oscillatory curve will be subject of a given damping, so that its distance 178 from the mean line 175 will be smaller. The case, however, will be different at the moment when all of the weighing apparatus is started. In this moment, as a matter of fact, the servo-motor 16 is in stand-still, and it should then be driven up to its full number of rotations, which may sometimes be rather high. For this reason some further steps are taken, which will be seen from FIG. 1.

The arm on the potentiometer 64 is connected over a conductor 188 with a bridge arrangement, consisting of the resistors 189, 190, 191, and 192. The resistors 190 and 192 are adjustable, whereas the resistors 189 and 191 are fixed. The adjustment of the resistors 190 and 192 takes place manually by means of an adjustment control 193. The two diagonal points, which are formed on the one hand between the resistors 189 and 190, and on the other hand between the resistors 191 and 192, are connected the one to the conductor 188 and the other one to the already earlier mentioned conductor 10. Between the two remaining diagonal points, that means the points which are formed on the one hand between the resistors 190 and 191 and on the other hand between the resistors 189 and 192, a voltage carrier circuit is connected, containing a source of voltage 194 and a switch 195.

The arrangement now described is used in the following way: As long as the weighing device is in position of rest, so that no load exists on the device 165, and consequently the tension variable resistors 61 and 63 are also in position of rest, so that the bridge 60–63 is in balance, normally the servo-motor 16 and the means driven by same should be in stand-still. When a load occurs, this will normally take place rather suddenly, and then the servo-motor 16 has to be started; but some time will be consumed, before this servo-motor works its speed up to full number of rotations. In order to avoid this loss of time and to avoid the possibility that the weighing is already begun during this period of time when the servo-motor is starting, whereby errors would be introduced, a bridge coupling 189–192 has been provided. The intention is, that one should adjust the resistors 190 and 192 manually by means of the control 193, which also can be provided with a pointer, moving over a scale 196, so that an unbalance is created in the bridge-coupling 189–192, corresponding to the assumed approximate weight of the load, which does not yet exist in the scoop 163. Between the conductors 10 and 11, therefore, a voltage will exist determined by the magnitude of the source of voltage 194 and the unbalance in the bridge arrangement 189–192, caused by the adjustment device 193, 196. This unbalance voltage is thereby chosen so that the servo-motor 16 is in rotation with a number of turns which at least approximately is in the vicinity of the number of turns which the servo-motor will probably assume when it is subjected to the voltage from the bridge arrangement 60–63.

When the weighing operation is started, the switch 195 is opened simultaneously as a load is created on the device 165, so that an unbalance is introduced into the bridge arrangement 60–63. The remaining unbalance voltage thus exclusively emanates from the bridge arrangement 60–63, whereas the bridge arrangement 189–192 now forms a normal series resistance in the conductor 10, to comprising two parallel branches. This series resistance will be different, dependent upon how the resistors 190 and 192 have been controlled, but as the circuit 10 is not carrying current but only voltage, this will not influence the function of the amplifier 12 or the means following after same. If the amplifier 12 should, however, be of such a kind that current is running through the conductor 10 and consequently also through the bridge arrangement 189–192, then a control arrangement other than the one shown in FIG. 1 has to be chosen. This might be a control arrangement with a voltage divider, fed by the battery 194, so that one will instead of determining the unbalance voltage by the relation between the resistance values in the bridge arrangements 189–192, determine the same unbalance voltage by controlling the voltage fed through the input diagonal points.

The consequence of this will be that the servo-motor 16 in the moment, when the weighing operation shall be started, is already in rotation with a number of turns, which approximates the number of turns, which the servo-motor will assume during the weighing operation. Therefore, the acceleration period or retardation period will be so strongly decreased, that no essential loss of time will exist, and, consequently, also errors will be avoided from being introduced or anyway will be decreased to such a small amount, that they are negligible.

The potentiometer 64 has for its main object to provide tare in such cases, when the weight of the carrier means for the load is known and this weight will remain constant. For instance, a crane hook and a wire, hanging on a cable may be tared by setting the tare potentiometer 64 so that the servo-motor 16 will indicate zero weight, when the crane hook and the wire hang freely on the crane. As a result, the introduced unbalance voltage due to change of the resistors 61 and 63 will exclusively be dependent upon the load, which will later on be attached to the crane hook by means of the wire. In many a case, however, it is not possible to provide tare in this way with the required accuracy. This, for instance, is the case when the crane lifts a scoop, for instance the scoop 163, FIG. 1, which is loaded with a more or less moist material. One knows by experience, that such moist material will easily stick to the inner surface of the scoop, and sometimes there will exist a thicker, sometimes a thinner layer of material in the scoop, which does not fall away when the scoop is opened. The tare weight in such a case obviously will be variable, but also this matter can be compensated. In this respect, a pair of so-called catcher switches are provided, one of which is thus closed, when the crane lifts its load, in order thereafter to remain closed, as long as the load remains in the crane, this switcher being again opened and the other one closed, when the crane drops its load. In the arrangement according to FIG. 1 it has been assumed, that this switch is controlled by the crane wire 164 itself by an arrangement, applied in connection with the crane pulley 197, so that either one of the two conductors 198 or 199, respectively, is carrying current during any measuring operation. These two conductors, however, are combined with the indicator 173 in such a way, that its counter works in the one direction, when the conductor 198 is carrying current, and in the other direction, when the conductor 199 is carrying current. Thereby, it will be possible to count first the weight of the scoop of the crane together with the parts belonging thereto and together with the load existing therein, in positive direction, and then, after the load has been dropped, the weight of the scoop together with the parts combined therewith being deducted in negative direction as tare weight. The indicator 173 will only indicate the difference in weight between the loaded and the un-loaded scoop and this difference is identical with the weight of the load.

In the above described arrangement, the servo-motor 16 is kept in rotation either with a number of turns, which exactly corresponds to the load in the crane scoop 163 together with the parts combined therewith, or with a number of turns, determined by the unbalance which is created by means of the source of voltage 194 in the bridge 189–192. In some cases, it may be unsuitable to keep the motor 16 in continuous rotation this way, particularly during such intervals of time when no counting should occur. For this purpose it may therefore be suitable to actuate the switch 195, FIG. 1, by a time relay 200, arranged in such a way that when the relay is magnetized, the switch 195 will immediately be closed, and the motor 16 will be started up to a number of turns in the same order of magnitude as that, corresponding to the load, whereafter the switch 195 will be opened and a measuring operation will be started. The arrangements for this purpose would be so self-evident to the man skilled in the art, that no detailed description of them would be required.

For describing the parts, shown in FIG. 1 in block diagram, it may first be explained that all of these parts could be of any construction suitable for the purpose. When one such construction is indicated, below, this must therefore only be regarded as a chosen form of execution of the invention, and the invention is of course not limited to the use of just this kind of counter 172 or 184, constant pulse generator 183 or indicator 173 and so on. The pulse generator 183 is shown in FIG. 3, which describes a known pulse generator construction, using relays, which has proved to have extremely high degree of constancy of the pulse times.

The constant pulse generator contains the following parts:

Basic for the generation of the pulses is a relay 201 with two windings 201' and 201'' respectively, counteracting each other. Both of these windings are connected with their one terminal to one terminal of the available direct net current mains, for instance the minus terminal. With their other terminal the winding 201' is connected to a resistor 202 and the winding 201'' to a condenser 203. Both of them are at their ends turned away from the relay windings, connected to a conductor, which runs to a non-magnetized relay closed contact 204 on the relay 201 and thereafter to the manual starting switch 205 of the arrangement and to the plus terminal of the source of voltage.

The function of the arrangement in the parts hitherto described, is as follows:

When the current is closed to the system, immediately a current will be created through the relay winding 201', limited by the magnitude of the resistor 202 connected thereto, but simultaneously a load current for the condenser 203 will be created through the relay winding 201''. As mentioned above, these two windings are wound in such a way, that they counteract each other, and during the loading period of the condenser 203 the the relay 201 will not attract. The more the condenser 203 approaches its full load, however, the load current will decrease, whereas the current limited by the resistor 202 will reman constant, disregarding, of course, that in the proper moment of closing it is subject to a successive increase, damped by the inductance of the relay winding 201'. The load current having decreased to a given value, the relay 201 will therefore attract, and as a consequence thereof the contact 204 is opened. As far as the current to the relay winding 201' is caused by the mains voltage, it will therefore cease this moment, but the load in the condenser 203 will nevertheless retain a current through the relay winding 201', which will in any moment be limited by the inductance of this relay winding, the magnitude of the resistor 202 and the remaining load voltage in the condenser 203. This discharge current passes also through the relay winding 201'', but now it runs through this winding in the opposite direction to that, which was the case during the loading period, and the attraction forces from the two windings will then cooperate, so that the relay will remain attracted during a given time after the contact 204 has been opened. The relay 201 will therefore not fall, and the contact 204 will not be closed, until the load voltage in the condenser 203 is practically used up. Thereby a new load current to the condenser 203 will be created in the abovementioned way, and thereafter the winding 201' will cause attraction of the relay, as soon as the condenser 203 is practically fully loaded, and a periodically repeated course of working will enter.

For the purposes, for which the arrangement has to be used in connection with the present invention, the pulse sequence thereby created will scarcely be sufficiently exact. Measurements have proved that the pulses do not vary at all or do only very unessentially in the total length of pulses, but that the relation between the voltage carrier part and the voltage free part of the pulse may vary. For improving the constancy of the pulses, therefore, two further relays 206 and 207 have been provided. These are fed in the below further indicated way from the plus terminal of the mains over the main switch 205 and a change over contact 208 on the relay 201.

From the position of rest of the change over contact 208 a conductor is running to a magnetized relay closed contact 209 on the relay 206, further through the one winding 207' of relay 207, which is provided with two cooperating windings 207' and 207'', respectively, further over a conductor 210 to the winding of the relay 206. The magnetized relay closed contact of the change over contact 208 is connected to a change over contact 211, controlled by the relay 207. Its contact of rest is connected to the conductor 210, whereas its magnetized relay closed contact is connected to the winding 207'' of the relay 207.

This arrangement functions the following way:

When the relay 201 is magnetized the first time, current is closed through the change over contact 208 in its magnetized relay position, the change over contact 211 in its position of rest, the conductor 210 and the winding of the relay 206, and this relay will immediately be attracted. It will then immediately switch over its magnetized relay contact 209 into closed position and thereby prepare a circuit for the relay winding 307', which will, however, not yet obtain current, because the circuit is still open at the change over contact 208. Somewhat later, however, the relay 201 will again fall, and now current is running from the plus terminal through the main switch 205, the change over contact 208 in its position of rest, the magnetized relay closed contact 209, the winding 207', the conductor 210 and the winding of the relay 206. The relay 206 will thus remain attracted and its magnetized relay closed contact 209 will remain closed. On the other side the relay 207 will attract itself, and will close its magnetized relay closed contact 211 for preparing a circuit, which will later on be completed. When the relay 201 thereafter again is magnetized, current will therefore run from the plus terminal through the main switch 205, the magnetized relay closed contact 208, the magnetized relay closed contact 211 and the relay winding 207''. Simultaneously, the earlier magnetization circuit for the relays 206 and 207 in series is opened, and the relay 206 falls, whereas, however, the relay 207 will remain attracted due to current through the winding 207''. Now the relay 201 falls a second time, and thereby the circuit for the relay winding 207" is opened, so that also the relay 207 falls.

It will be evident from this that the relays 206 and 207 will be attracted and will fall, respectively in alternating time, however, in such a way, that the attraction period of time is equally long as the sum of one attraction period of time and one non-magnetized period of time of the relay 201, and that the non-magnetized period of time of the relays 206 and 207 is equally long as the attraction time. The consequence is, that one can provide a contact, for instance a contact 212 on the relay 207, which will serve as a pulse generator contact with an exceedingly high degree of accuracy. The pulse frequency, however, will only be the half part of the attraction frequency or falling frequency, respectively, of the relay 201, but the accuracy will instead be much higher.

An arrangement according to FIG. 3 is suitably used as a constant pulse generator 183 in the system according to FIG. 1.

Now the construction of the counter 184, FIG. 1, shall be described. One form of execution of such a counter, which consists in full in counter relays in a relay chain is shown in FIG. 4.

For starting the relay chain 184 a push-button switch 187 is provided at the crane engineer or in another suitable place, as mentioned above. The starting circuit, however, must not be closed as long as the lift motor of the crane is carrying current, because this would mean that an acceleration or retardation force could be introduced in the weighing result, which would make this misleading. The starting circuit therefore runs in series over a contact 213, controlled by the lift motor and the push-button switch 187 to a couple of starting relays 214 and 215 in parallel coupling. The relay 214 is quick acting whereas the relay 215 is provided with a short circuit winding 216, making it slow acting. The relay 214 only carries one single contact, viz. the magnetized relay closed contact 217, which connects positive voltage to the conductor 186, see FIG. 1, for resetting the counter 172, so that this one shall be prepared to receive a new measuring pulse series from the photo transistor 171 and to indicate on the indicator 173 the measuring result.

Sometime after marking of resetting or zero positioning has taken place over the conductor 186, the relay 215 is attracted. Then this relay closes its magnetize relay closed contact 218, whereby current is fed to a quick-acting relay 219. The relay 219 has four magnetized relay closed contacts 220, 221, 222 and 223. The contacts 220 goes to a holding circuit for the relay 219, running over a reset contact 224 on the break-out relay 225, which acts in a way further explained below. The contact 221 closes the circuit for a signal lamp 226 at the push-button switch 187 for marking that the weighing operation has started, and that the engineer can therefore release the push-button. The contacts 222 and 223 finally close the circuits 227 and 228 from the constant pulse generator according to FIG. 3 over the conductors 229 and 230, respectively, to the counter relay chain, so that this can start counting pulses from the constant pulse generator.

The proper counter relay chain contains a start relay 231, a number of intermediate relays 232-235 and an end relay 236. The start relay 231 has only one winding, whereas the remaining relays 232-236 have each two windings wound in the same direction. The contact arrangement of the relays is seen in FIG. 4.

This arrangement functions in the following way:

The start relay 219 having been attracted, and the contacts 222 and 223 having been closed, pulses are transmitted from the constant pulse generator 183, FIG. 1 to the counter relays in the counter 184, FIG. 4. The first closing pulse is created, when the relay 207, FIG. 3, is attracted, so that positive voltage is fed to the conductor 227 and over the contact 222, FIG. 4, and the conductor 229 is led to a series of contacts 237-241 and to the winding of the start relay 231 and minus terminal. The relay 231 then is attracted.

When the current closing pulse ceases, the closed contact at the contact place 212, FIG. 3, is opened, and the open contact at the same contact place is closed. This, however, takes place while maintaining the continuity so that the relay 231, FIG. 4 has no time to be released until an opening pulse is transferred over the conductor 228, FIG. 3, the contact 223, FIG. 4, and the conductor 230 to the magnetized relay closed contact 242 of the relay 231 and thereafter in series to the upper winding of the relay 232 and the winding of the relay 231. The relay 231 remains attracted over this circuit, and the relay 232 is attracted.

Thereafter the second closing pulse follows over the conductor 227. This is fed the same way through the start relays through the conductor 229 and from this over the contacts 237-240 in their positions of rest and through the contact 241 in its magnetized relay position to the lower winding of the relay 232 and the minus terminal. The earlier magnetization circuit of the relays 232 and 231, which run over the winding 231 and the upper winding on the relay 232, is opened. Consequently the relay 231 falls but the relay 232 will remain attracted.

When thereafter the second opening pulse ceases, the just described circuit is opened, upholding the continuity, but instead the circuit is closed from the plus terminal over the conductor 228, the contact 223, the conductor 230, the contact of rest 242 and the magnetized relay closed contact 243 to the upper winding of the relay 233 and the lower winding of the relay 232 in series, so that the relay 232 remains attracted and the relay 233 is attracted.

When the third closing pulse starts, it is true that this circuit is opened, but instead the circuit is closed from the plus terminal over the conductor 227, the contact 222, the conductor 229, the contacts of rests 237, 238 and 239, the magnetized relay closed contact 240 and the lower winding of the relay 233, which remains thus attracted. On the other side, the relay 232 is now released.

It is easy to see, that the following relays are connected in a symmetrical repeated sequence, and therefore, a continuous description of the progress would not be required. It may therefore be enough to mention, that after $x$ pulses the relay 236 is attracted, thereby closing its contacts 244, and current is fed to the break out relay 225 over a circuit from the plus terminal over the contact 244, the conductor 245, the winding of the relay 225 and the minus terminal. This relay therefore is attracted and thereby opens its contact 224, which held the start relay 219 attracted. The start relay 219 thereby is released and opens at the contacts 222 and 223 the closing pulse circuit 229 as well as the opening pulse circuit 230, and all of the relays 231-236 are immediately current free and released. Thereby also the contact 244 on the end relay 236 is opened and the break out relay 225 consequently falls, so that all of the counter relay apparatus has returned into its position of readiness for the next counter operation.

The counting of the $x$ pulses is assumed to have taken exactly the time, which was regarded desired for the weighing operation, for instance a period of time 182 according to FIG. 2. During all of this time thus the counter relay chain 172 was in function. This statement of the counter relay chain 172 has been provided by the indicator conductor 185 giving current to start the relay, when the relay 219 was attracted, and opening this circuit of current feed simultaneously with the relay 219 being released.

By means of a constant pulse generator of the kind shown in FIG. 3, pulses can be obtained of a duration, which can be chosen within very wide limits by suitably dimensioning the resistor 202 and the condensor 203. If the pulse duration shall be very long, however, the dimensions of the resistor and the condenser easily become impractical, and one will lose somewhat as to accuracy. For instance, it is possible to obtain a much higher accuracy by means of a hundred pulses of 0.1 second duration than by means of 10 pulses of a full second's duration. Therefore, it is desirable that the number of pulses should be rather large. At big numbers of pulses within the weighing period, however, one single counter relay chain of the kind shown in FIG. 4 will in its turn get too big dimensions, and one can then in a way known per se provide a digital secondary counter relay chain, so that the end relay 236 by means of a contact 244, which would thereby be a change over contact, gives pulses to the secondary chain the same way as the primary chain obtained its pulses over the conduits 227 and 228 from the contact 212, see FIG. 3. With ten relays in the primary chain and ten relays in the secondary chain one can then indicate a weighing period of time corresponding to one hundred pulses. Of course, it is possible to vary this detail in all different ways, according to the needs existing in each separate case.

It is also obvious, that one is not bound to the use of counter relay chains for the counting operations, but that one can use any other kind of suitable counters, for instance transistor counters, rotational selectors and so on, and also that one is not bound to a decade counting system, but one can with equal advantage use any other deliberate counting system. If one uses as a counter a cascade coupling according to Eccles-Jordan, then it will be rather natural for example to make the counting according to a dual system.

The counter 172 has been shown in FIG. 5 in a wiring diagram corresponding to the wiring diagram in FIG. 4, but it is assumed, that the same reservations apply to both these counters.

In FIG. 5 one will thus find as pulse creator the photo transistor 171 from FIG. 1. Further one will find from FIG. 4 partly the start and stop conductor 185, partly also the zero setting conductor 186.

The photo transistor 171 is connected into the grid circuit of an electronic valve 246. The indication used in FIG. 5 for this electronic valve is fully schematical, and in the execution of the arrangement specific steps must of course be taken in order of providing this electronic valve with a suitable grid bias and so on. In the anode circuit of the electronic valve a pulse repeater relay 247 is connected, at the contact 248 of which consequently pulses interrupted by interpulses are created in mainly the same way as at the relay 207 in the constant pulse generator of FIG. 3. Thereby the conductors 249 and 250 correspond to the output conductors 227 and 228 from the constant pulse generator, said conductors 249 and 250, however, being carried on over a couple of magnetized relay closed contacts 251 and 252 on the start relay 253, which is magnetized over the conductor 185. The consequence is that pulses from the relay 247 will only pass to the counter over the conductors 254 and 255 during the period of time, when the relay 253 is attracted due to the conductor 185 carrying voltage, that means during the time measured by means of the counter according to FIG. 4.

It is now assumed, that the counter of FIG. 5 shall count up to one hundred pulses. It is therefore composed by two decadic counter relay chains. If more than two figures should be decided one can of course in a way, obvious to the man skilled in the art, build up the counter by means of one or more further such decadic chains. The first decadic chain contains the start relay 256, a number of intermediate relays 257–260 and the end relay 261, and the second decadic counter relay chain contains in a corresponding way the start relay 262, the intermediate relays 263–266 and the end relay 267.

The counting operation of the relay chains is identically the same as already described in connection with the counter relay chain contained in FIG. 4, and therefore a renewed description thereof would scarcely be required. They only differ from the relay chains according to FIG. 4 in the following respects.

(1) For providing resetting, all relays are connected to minus terminal over a common conductor 268, which is fed with its voltage over a contact of rest 269 on the relay 270. The winding of this relay is connected to the zero setting conductor 186 with the action, that the relay is magnetized when the zero setting conductor obtains for a short time voltage when the relay 214, FIG. 4 is attracted, and all of the relays contained in the counter relay chains according to FIG. 4 get current free and are released, so that the counter relays at the beginning of the weighing period are in their positions of rest shown in FIG. 4.

(2) For providing pulse creation to the second decadic chain, a contact 271 on the end relay 261 in the first relay chain is arranged as pulse creator contact and provides two conductors 272 and 273 alternatively with voltage the same way as already described in connection with the conductors 249 and 250 of FIG. 5 or the conductors 227 and 228 of FIG. 3.

(3) The two decadic chains are further provided with figure indicating contacts. It is reminded in this connection, that when the first closing pulse entered, the start relay 256 in the units chain or the start relay 262 in the tenth chain was attracted as the only attracted relay. When this first closing pulse ceased, the relay 257 or the relay 263, respectively, was attracted, without the relay 256 or the relay 262, respectively, thereby being released. The relay 256 or 262, respectively, were not released until at the entering of the second closing pulse, so that thereafter during the period of this second pulse the relays 257 and 263 were attracted as the only ones.

For indication of the correct figure it is therefore necessary, that the circuit is closed for feeling the position of three relays. If the number of order of the relay is indicated by $n$, then a feeling must take place of the relay with the number of order $n-1$ in order of stating, that this relay is released, further of the relay with the number of order $n$ in order of stating, that this relay is attracted, and finally of the relay with the number of order $n+1$ in order of stating, that this relay is released. Assuming for instance, that the figure to be indicated by the unit counter is the figure 3, then this means that the relay 258 must be attracted, whereas the relays 257 and 259 should be released. The indication cricuit then runs from the plus conductor 274 over a contact of rest 275 on the relay 257, a magnetized relay closed contact 276 on the relay 258 and a contact of rest 277 on the relay 259 to the conductor 278 and to the lamp for the figure 3 in the indicator 279. In a similar way, the position of the relay chain for tens counting is indicated by means of the lamp indicator 280.

The lamp indicators are zero-set automatically by the presence of opening contacts in their circuits, when the relay chains are zero-set, as far as thereby all of the relays contained are transferred into their non-magnetized positions of rest. This takes place by disconnection of the minus voltage at the contact 269 of the relay 270, when this is magnetized over the conductor 186.

The invention, of course, is not limited to the specific forms of execution, described above and shown in the drawings, but all different kinds of modifications may occur within the frame of this invention.

What I claim is:

1. An apparatus for weighing oscillating loads and comprising a load supporting means, said load supporting means including means having an electrical characteristic variable in response to the oscillating load, means connected to said variable means for generating a sequence of pulses having a pulse frequency which at any instant is responsive to said electrical characteristic so as to be proportional to the oscillating load at that instant, and a measuring apparatus connected to said pulse generating means for indicating the number of pulses generated during a predetermined period of time, said period of time being several times greater than oscillation period of the load so that the total number of pulses within said period of time will be indicative of the load.

2. An apparatus for weighing oscillating loads as claimed in claim 1 wherein said variable means comprises a bridge coupling having a plurality of resistors therein, one of said resistors being connected to said load and having its electrical resistance being responsive to said load, a direct current source feeding said bridge coupling, an amplifier connected to the output of said bridge coupling, a servo-motor connected to the output of said amplifier and driven by the output voltage thereof, a tachometer generator drivingly connected to said servo-motor and having its output connected to said amplifier to feed into the amplifier a voltage which is in opposite direction to bridge coupling voltage fed into said amplifier, a pulse generator drivingly connected to said servo-motor and having a pulse frequency at any instant proportional to the rate of rotation of said servo-motor, a counter operatively connected to said pulse generator to receive said pulses, and means for actuating said counter, for a predetermined time interval so that the number of pulses can be measured during that time interval.

3. Claim 2 wherein said direct current source is connected across two opposed points of said bridge coupling, said amplifier being connected to one of the other two opposed points of said bridge coupling, electrical resistance means having one side thereof connected to the second of the other two opposed points of said bridge coupling, a voltage source connected to said electrical resistance means, a switch operable to disconnect and connect said voltage source to said electrical resistance means, the other side of said electrical resistance means being connected to said amplifier, and means for adjusting said voltage source in such a manner that the input to said amplifier from said bridge coupling will rotate said servo-motor at a speed approximately equal to the speed corresponding to the weight of the load.

4. Claim 3 wherein said resistance device comprises four resistors connected to form an electrical bridge, one of two opposed points of said bridge being connected to said bridge coupling and the second of said two approved points connected to said amplifier, the other two opposed points being connected to said voltage source.

5. Claim 3 and further comprising a time relay operatively connected to actuate said voltage source switch, said relay being energized for a period of time sufficient to enable said servo-motor to come up to the speed corresponding to the load.

6. Claim 2 and further comprising means connected to said counter actuating means for printing the weight of the load on a continuous control strip.

7. Claim 2 wherein said counter actuating means comprises a second counter, a constant pulse generator connected to feed pulses to said second counter so that said second counter will interrupt the operation of said first counter when a predetermined number of pulses has been fed to said second counter.

8. Claim 2 wherein said pulse generator comprises a lock disc, a light source for said lock disc, and light responsive means receiving light pulses from said light source and lock disc for transmitting pulses to said counter.

9. Claim 1 and further comprising means connected to said measuring apparatus for initiating the weighing operation after the lifting movement of the load has ceased.

10. Claim 7 and further comprising electrical control means connecting said second counter to said first counter to start and stop the operation of said first counter.

11. Claim 10 and further comprising second electrical control means connecting said first and second counters for setting said first counter to zero before commencing a counter operation.

12. The apparatus of claim 1 in which the means having an electrical characteristic variable in response to the oscillating load includes electrical strain gauges connected to support the oscillating loads, and a direct current source connected in circuit with the strain gauges to produce a direct current output voltage which is instantaneously proportional to the oscillating load and in which the pulse generating means is responsive to said output voltage.

13. The apparatus of claim 12 including timing means connected to the measuring apparatus to indicate said predetermined period of time, and means to initiate operation of the timing means and simultaneously to make the measuring apparatus effective, the timing means making the measuring apparatus ineffective at the end of said predetermined period of time.

References Cited in the file of this patent

UNITED STATES PATENTS

| | | |
|---|---|---|
| 2,678,206 | Muldoone et al. | May 11, 1954 |
| 2,723,844 | Thurston | Nov. 15, 1955 |
| 2,746,739 | Philippouvic | May 22, 1956 |
| 2,758,830 | Bentley | Aug. 14, 1956 |
| 2,767,975 | Horst et al. | Oct. 23, 1956 |
| 2,828,468 | Ball et al. | Mar. 25, 1958 |
| 2,873,107 | Lyons | Feb. 10, 1959 |
| 2,925,983 | Kennaway et al. | Feb. 23, 1960 |
| 2,927,785 | Lyons | May 8, 1960 |
| 2,938,701 | Thorsson | May 31, 1960 |
| 2,945,166 | Bell | July 12, 1960 |
| 2,950,910 | Kennedy | Aug. 30, 1960 |
| 2,954,969 | McCullough et al. | Oct. 4, 1960 |
| 2,967,749 | Strickler | Jan. 10, 1961 |
| 3,001,117 | Sikorra | Sept. 19, 1961 |
| 3,002,141 | Aliaga-Moyano | Sept. 26, 1961 |

FOREIGN PATENTS

| | | |
|---|---|---|
| 625,622 | Germany | Feb. 12, 1936 |